United States Patent
Pan

(10) Patent No.: US 10,321,506 B2
(45) Date of Patent: Jun. 11, 2019

(54) MOBILE PHONE WIFI ACCELERATOR AND METHOD

(71) Applicant: Sichuan Subao Network Technology Co., Ltd., Chengdu (CN)

(72) Inventor: Kun Pan, Chengdu (CN)

(73) Assignee: Sichuan Subao Network Technology Co., Ltd., Chengdu (CN)

( * ) Notice: Subject to any disclaimer, the term of this patent is extended or adjusted under 35 U.S.C. 154(b) by 51 days.

(21) Appl. No.: 15/674,306

(22) Filed: Aug. 10, 2017

(65) Prior Publication Data

US 2018/0110080 A1 Apr. 19, 2018

(30) Foreign Application Priority Data

Oct. 13, 2016 (CN) .......................... 2016 1 0894424

(51) Int. Cl.
*H04W 76/16* (2018.01)
*H04W 24/08* (2009.01)
(Continued)

(52) U.S. Cl.
CPC ........... *H04W 76/16* (2018.02); *H04W 48/18* (2013.01); *H04L 43/0894* (2013.01); *H04L 43/16* (2013.01);
(Continued)

(58) Field of Classification Search
CPC ..... H04W 76/16; H04W 48/18; H04W 24/08; H04W 84/042; H04W 80/06;
(Continued)

(56) References Cited

U.S. PATENT DOCUMENTS 9,396,633 B1 * 7/2016 Sannala ........... G08B 13/19619
9,992,622 B2 * 6/2018 Doeweling ........... H04W 4/023
(Continued)

FOREIGN PATENT DOCUMENTS

CN 102595544 A 7/2012
CN 103068021 A 4/2013
(Continued)

OTHER PUBLICATIONS

SurroundSense: Mobile Phone Localization via Ambience Fingerprinting; Martin Azizyan MobiCom'09, Sep. 20-25, 2009, Beijing, China. (Year: 2009).*
(Continued)

*Primary Examiner* — Marcus Smith
*Assistant Examiner* — Mohammed S Chowdhury
(74) *Attorney, Agent, or Firm* — Gokalp Bayramoglu

(57) ABSTRACT

Disclosed is a mobile phone wifi accelerator and method. The mobile phone wifi accelerator includes a smart mobile phone terminal including a WIFI module and a 4G module. The WIFI module is configured to establish a communication connection with a WIFI network. The 4G module is configured to establish a communication connection with a 4G network. An online game server is respectively connected to the WIFI network and the 4G network. The method avoids the problem that the WIFI network acceleration technology in the prior art cannot fundamentally solve the defect of instable WIFI networks.

13 Claims, 1 Drawing Sheet

(51) Int. Cl.
*H04L 12/26* (2006.01)
*H04W 80/06* (2009.01)
*H04W 84/04* (2009.01)
*H04W 84/12* (2009.01)
*H04W 88/06* (2009.01)
*H04W 4/44* (2018.01)
*H04W 4/90* (2018.01)
*H04W 48/18* (2009.01)
*H04L 29/08* (2006.01)

(52) U.S. Cl.
CPC ............ *H04W 24/08* (2013.01); *H04W 80/06* (2013.01); *H04W 84/042* (2013.01); *H04W 84/12* (2013.01); *H04W 88/06* (2013.01)

(58) Field of Classification Search
CPC .. H04W 84/12; H04W 88/06; H04L 43/0894; H04L 43/16
USPC .......................................................... 370/253
See application file for complete search history.

(56) References Cited

U.S. PATENT DOCUMENTS

| | | | | |
|---|---|---|---|---|
| 2011/0286437 | A1* | 11/2011 | Austin ..................... | H04W 4/02 370/338 |
| 2014/0162683 | A1* | 6/2014 | Rochberger .......... | H04W 64/00 455/456.1 |
| 2014/0361905 | A1* | 12/2014 | Sadasivam ............. | G08C 17/02 340/870.01 |
| 2015/0087239 | A1* | 3/2015 | Yang ..................... | H04W 24/08 455/67.11 |
| 2015/0228153 | A1* | 8/2015 | Hedrick .............. | G07F 17/3225 463/25 |
| 2018/0098196 | A1* | 4/2018 | Dal Santo ............... | H04L 67/02 |

FOREIGN PATENT DOCUMENTS

| | | |
|---|---|---|
| CN | 103607780 A | 2/2014 |
| CN | 105430701 A | 3/2016 |
| CN | 105592515 A | 5/2016 |
| CN | 105764079 A | 7/2016 |

OTHER PUBLICATIONS

A Real-Time Location-Based Services System Using WiFi Fingerprinting Algorithm for Safety Risk Assessment of Workers in Tunnels Peng Lin,Qingbin Li,1 Qixiang Fan,2 Xiangyou Gao,1 and Senying Hu1; Accepted Feb. 17, 2014; Published Apr. 17, 2014 (Year: 2014).*
An Improved Algorithm to Generate a Wi-Fi Fingerprint Database for Indoor Positioning Lina Chen 1,2,3,*, Binghao Li 3, Kai Zhao 3, Chris Rizos 3 and Zhengqi Zheng; Published: Aug. 21, 2013 (Year: 2013).*
Smartphones based Crowdsourcing for Indoor Localization Chenshu Wu, Student Member, IEEE, Zheng Yang, Member, IEEE, and Yunhao Liu, Senior Nov. 2013 (Year: 2013).*

* cited by examiner

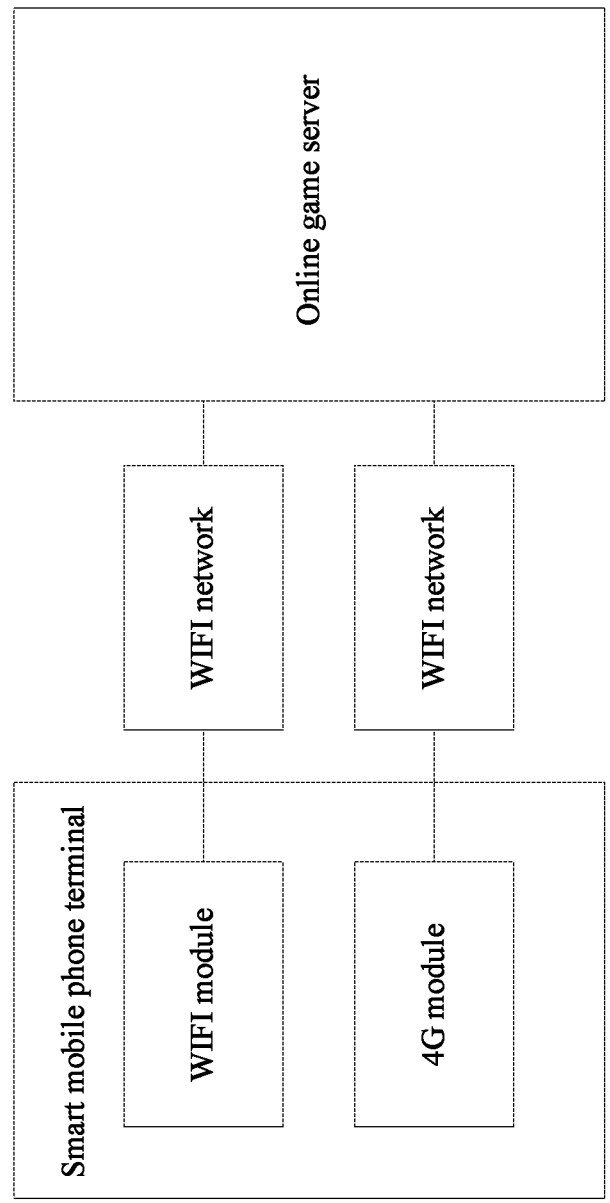

MOBILE PHONE WIFI ACCELERATOR AND METHOD

CROSS-REFERENCE TO RELATED APPLICATIONS

This application claims priority from a Chinese Application Serial No. 201610894424.6, filed on Oct. 13, 2016, the contents of which are hereby incorporated herein in their entirety by this reference.

TECHNICAL FIELD

The present invention relates to the technical field of mobile phones, and in particular with a mobile phone wifi accelerator and method.

BACKGROUND

By December, 2015, there are almost 390,000,000. the mobile game players in China. 70% of them use WIFI networks to play games. However, the WIFI network has the following problems:

1. Weak signal coverage;
2. Unstability; If a player accessing the same WIFI network uses services (such as watching or downloading video and so on) with large bandwidth resources, it will affect other players under the same WIFI network; and
3. In view of the problems such as the power consumption of the WIFI chip, the mobile phone device is inherently less stable than fixed network.

Statistics indicate that when playing games by accessing a WIFI hotspot, about 30% of to users may have the problem of network delay, which would greatly affect the gaming experience There are the following existing WIFI acceleration technologies on the market.

(1) Channel Acceleration Method

When a certain WIFI router channel is used by too many devices, there will be mutual interferences between signals, thus affecting network stability. Due to the authorization of ANDROID and IOS operating systems, the user layer cannot select the channel directly. The prior art tries to switch on and switch off the WIFI module to re-access the network, and the WIFI device may allocate different channels to a terminal.

The defect of the channel acceleration method is that whether it works totally depends on the WIFI device.

(2) WIFI Router Configuration

When a public WIFI router is accessed by too many devices, there will be a bandwidth resource preemption problem among the devices, affecting bandwidth and causing delay. The WIFI networks in some public places cannot meet the basic demand of mobile phone games at all. Under the premise of owning the administrator authorization of the WIFI router, bandwidth limit may be configured for devices, avoiding each device occupying too many resources.

The defects of WIFI router configuration are that the user needs to own the administrator authorization of the current router, a non-professional user does not possess the technical capability of configuring the bandwidth authorization, and the problems of the WIFI devices in public places cannot be solved.

(3) WIFI Signal Strengthening

In the case where the coverage of the WIFI signal is weak and the network stability cannot be guaranteed, the terminal system configuration is modified to improve the transmission power of the WIFI chip and achieve the effect of boost the signal.

The defects of WIFI signal boosting are that it needs the support of the operating system of the terminal device, there is a compatibility problem, and whether it works depends on the instant network environment.

In summary, the existing WIFI network acceleration technology cannot fundamentally solve the defect of unstable WIFI networks.

SUMMARY

The technical problem to be solved by the present invention is to provide a mobile phone wifi accelerator and method, avoiding the problem that the WIFI network acceleration technology in the prior art cannot fundamentally solve the defect of unstable WIFI networks.

In order to solve the above problem, the technical solution of the present invention is as follows.

A mobile phone wifi accelerator comprises a smart phone terminal including a WIFI module and a 4G module, wherein the WIFI module is configured to establish a communication connection with a WIFI network;

the 4G module is configured to establish a communication connection with a 4G network;

an online game server is respectively connected to the WIFI network and the 4G network.

When the smart phone terminal transmits/receives data with the online game server through the WIFI network or the 4G network, the communication protocols include UDP or TCP protocols.

The method of the mobile phone wifi accelerator is in particular as follows.

The smart mobile phone terminal activates the 4G network as an alternative while accessing the WIFI network through the WIFI module. When the smart phone terminal transmits/receives data with the online game server through the WIFI network, if the data transmission rate is higher than a preset lower limit rate value, data transmission is performed merely with the WIFI network; and if the data transmission rate is lower than the preset lower limit rate value, a communication connection is established between the smart mobile phone terminal and the online game server by activating the 4G network, such that data transmission is performed with both the 4G network and the WIFI network.

Compared to the prior art, by means of the structure in the present invention, the advantages of the present invention are as follows.

If the data transmission rate is higher than a preset lower limit rate value, data transmission is performed merely with the WIFI network, and if the data transmission rate is lower than the preset lower limit rate value, a communication connection is established between the smart mobile phone terminal and the online game server by activating the 4G network, such that data transmission is performed with both the 4G network and the WIFI network, thereby really realizing the object of ensuring the stability of the gaming network.

BRIEF DESCRIPTION OF THE DRAWINGS

FIG. 1 is a schematic diagram of the overall structure of a mobile phone wifi accelerator.

DETAILED DESCRIPTION

In order to make the object, technical solution and advantages of the present invention more clear, the present invention will be described further in detail hereinafter in conjunction with the accompanying drawings and embodiments. It should be understood that the particular embodiments described here are merely used to illustrate the present invention rather than limiting the present invention.

As shown in FIG. 1, a mobile phone wifi accelerator comprises a smart mobile phone terminal including a WIFI module and a 4G module.

The WIFI module is configured to establish a communication connection with a WIFI network.

The 4G module is configured to establish a communication connection with a 4G network.

An online game server is connected to the WIFI network and the 4G network.

When the smart mobile phone terminal transmits/receives data with the online game server through the WIFI network or the 4G network, the communication protocols include UDP or TCP protocols.

The method of the mobile phone wifi accelerator is in particular as follows.

The smart mobile phone terminal activates the 4G network as an alternative while accessing the WIFI network through the WIFI module, and when the smart mobile phone terminal transmits/receives data with the online game server through the WIFI network, if the data transmission rate is higher than a preset lower limit rate value, data transmission is performed merely with the WIFI network, and if the data transmission rate is lower than the preset lower limit rate value, a communication connection is established between the smart mobile phone terminal and the online game server by activating the 4G network, such that data transmission is performed with both the 4G network and the WIFI network.

The smart mobile phone terminal accesses the WIFI network through the WIFI module in such a way that the smart mobile phone terminal accesses the WLAN network by establishing a connection with an AP through the WIFI module. However, in this method, after the number of smart mobile phone terminals of the user has reached a certain threshold, the open AP cannot satisfy the connection demand, and thus the AP will be invalid.

On the other hand, if an activation mechanism is introduced, after the number of smart mobile phone terminals has reached a certain threshold, a closed AP is activated for connection. Currently, in an output signal of a multi-channel radio frequency link, a controller has to detect all radio frequency interfaces of an AP, and thus all radio frequency interfaces can transfer a link detection signal regularly, causing lack of resources for forming the link detection signal. Furthermore, during most time periods, the AP does not need to continuously transfer the link detection signal. Thus, at present, the link detection signal is transferred irregularly to reduce the number of transfers and power consumption. That is, the controller determines whether the AP needs to transfer a link detection signal depending on the particular condition. If yes, then the controller sends an activation signal via the link transmission control of the data link layer to notify the AP to transfer the link detection signal, and the AP transfers the link detection signal after being activated. However, once all APs meeting the requirement of transferring a link detection signal are activated through link transmission control, then there will be a big loss in link transmission control.

Thus, according to the above defects, at present, the APs in an area are classified. The same class of APs has the same class identifier. The APs in one class are further divided according to the sequence numbers thereof in the class. Here, each class has one link transmission control respectively. Depending on the sequence number of an AP in the class, all APs have their own corresponding signal bits in the link transmission control. Hence, the controller merely needs to send an activation signal via one link transmission control. All APs in the class corresponding to this link transmission control can acquire the activation signal. Then, the AP in the class also determines the link transmission control signal bits to be employed for transmitting the activation signal, i.e., the AP decides whether itself has already been activated. By means of this method, compared to the method that all APs employ one link transmission control to transmit an activation signal, the link transmission control loss can be greatly reduced.

However, once there are few APs to be activated and dispersed in various classes, it still needs to employ several link transmission controls. That is, the benefit of reducing the link transmission control overhead in combination with the class activation solution will not be outstanding. For example, if the first to thirds AP to be activated belong to the first to third classes respectively, an activation signal needs to be transmitted via three link transmission controls, which is the same as the number of link transmission controls to be employed for transmitting the activation signal to each AP. How an activation signal activates APs as many as possible to improve the activation effect of the activation signal is an urgent problem to be solved.

The smart mobile phone terminal accesses the WIFI network through the WIFI module in such a way that the smart mobile phone terminal accesses the WLAN network by establishing a connection with an AP through the WIFI module, and a method of activating the AP in the WLAN network includes steps 1-8 as below.

Step 1 includes calculating the number of APs required for the full coverage of the WLAN network: determining the number of APs required for the full coverage of the WLAN network according to the coverage when the transmission powers of the WLAN and of a single AP are default, dividing the individual coverage area of each AP by the total area of the WLAN area, and rounding up to obtain an integer N.

Step 2 includes performing clustering and recognition on all APs as 4N, performing clustering on APs intensively deployed in the WLAN, arbitrarily selecting an origin of coordinates in the coverage area of the WLAN, establishing a 2D rectangular coordinate system, and performing clustering on APs intensively deployed and distributed evenly in the WLAN by geographical locations through a clustering algorithm, the target being 4N class.

Step 3 includes forming 4N AP topologies: selecting to close most APs according to the clustering result, realizing full coverage of WLAN wireless signals with the remaining APs, at the same time forming an AP distribution structure, and initializing an AP transmission power optimization method; within each class, selecting an AP at or closest to the clustering center to be an AP to be opened possibly and closing the remaining APs.

Step 4 includes selecting to open N APs, wherein the particular process includes: setting a set U as a set of APs to be selected to open, first selecting any AP and adding the same to the set U to obtain U={AP1}; secondly selecting an AP furthest away from this AP and adding the same to the set U to obtain U={AP1, AP2}; then calculating the distance $d_{ij}$ between any of the remaining $AP_i$ and an AP in the set U={AP1, AP2 . . . , APj}, letting $d_i = \min\{d_{i1}, d_{i2}, \ldots, d_{ij}\}$; and then selecting the AP corresponding to the maximum element in the set {d1, d2, . . . , di} and adding the same to the set U to obtain U={AP1, AP2, . . . , APj, APj+1} until the number of elements in the set U reaches N.

Step 5 includes detecting whether the APs in the fully open set U can fully cover the WLAN, if not, then continuing to selecting an AP from the 4N APs to be selected and adding the same to the set U until the full coverage requirement of the WLAN is satisfied, and at the same time closing the remaining APs; and then performing step 6.

Step 6 includes determining whether the power can be reduced under the premise of satisfying the full coverage of the WLAN, if not, then ending the AP transmission power optimization method; otherwise, reducing the transmission power of a designated AP until all APs operate with the lowest power consumption.

Step 7 includes after the number of connected users of an open AP reaches a certain threshold, sending by the open AP a request to a controller to open a nearby closed AP, receiving by the controller the request and then issuing by the controller an instruction to activate a closed AP near the open AP to cause the same to exit from the hibernation mode; and at the same time, sending by the controller a command to the open AP to narrow the coverage range thereof, thereby causing the area to come into a high density deployment mode.

Step 8 includes the particular flow of the activation method by means of sending instructions in step 7, which includes steps 8-1 to 8-5.

Step 8-1 includes determining an AP to be activated at this moment, wherein each AP belongs to no less than one class synchronously.

For example, the instant region has 16 APs: AP1-16, divided into 8 classes. Class 1 has AP1-4, class 2 has AP5-8, class 3 has AP9-12, class 4 has AP13-16, class 5 has AP1, APS, AP9 and AP 13, class 6 has AP2, AP6, AP10 and AP14, class 7 has AP3, AP7, AP11 and AP 15, and class 8 has AP4, APB, AP12 and AP 16.

It can be obtained after the above classification that each AP belongs to two classes synchronously. For example, AP1 belongs to classes 1 and 5 synchronously, and AP2 belongs to classes 2 and 6 synchronously.

If AP2, AP6, AP11 and AP14 have to be activated at this moment, the activation device determines that the APs to be activated at this moment are: AP2, AP6, AP11 and AP14.

Step 8-2 includes counting the number of APs to be activated at this moment in each class.

For example, based on step 8-1, if it is determined that the APs to be activated at this moment are AP2, AP6, AP11 and AP14 in step 8-1, the activation device counts the number of APs to be activated at this moment contained in each class according to the determined AP. Thus it will be known that classes 1-4 and class 7 have one AP to be activated respectively, class 6 has 3 APs to be activated but classes 5 and 8 have no APs to be activated.

Step 8-3 includes picking up the class with the largest number of APs to be activated at this moment as an activation class.

For example, if it is known in step 8-2 that classes 1-4 and class 7 have one AP to be activated respectively, class 6 has 3 APs to be activated but classes 5 and 8 have no APs to be activated, then in this step (i.e., step 8-3), the activation device can determine that class 6 has the maximum number of APs to be activated, and thus picks up class 6 as the activation class.

Furthermore, if there is more than one class "with the largest number of APs to be activated at this moment", any one class is picked up as an activation class. The pickup policy may be random or may be preconfigured.

Step 8-4 includes transferring activation information through the picked activation class to activate an AP to be activated at this moment in the activation class.

For example, if class 6 is picked as the activation class in step 8-3, then in step 8-4, the activation device transfers the activation signal depending on class 6, that is, it is able to pick up the link transmission control corresponding to class 6 depending on the class identifier of class 6, and indicates the AP to be activated in the picked link transmission control depending on the numbering of the AP in class 6. For example, the numberings of AP2, AP6 and AP14 in class 6 are 1, 2 and 4 respectively, then the signal bits corresponding thereto in the link transmission control are the first digit, the second digit and the fourth digit respectively. If in the signal bits, 0 represents activation and 1 represents deactivation, the link transmission control signal transferred at this moment can be 0010, then after all APs in class 6 receive this link transmission control signal, they can decide whether they need to be activated depending on the numberings thereof in class 6. For example, AP2 detects that the first digit of the signal bits in the link transmission control signal is 0, then it decides that itself needs to be activated. AP10 finds that the third digit of the signal bits in the link transmission control signal is 1, then it decides that itself does not need to be activated, and so on. If an AP decides that itself needs to be activated, then it transfers a link detection signal to the activation device. Otherwise, it does not need to not be activated, then it will not operate.

Step 8-5 includes determining whether all APs to be activated at this moment are activated, if yes, then ending the flow; otherwise, going back to perform the steps of determining an AP to be activated at this moment, that is, going back to perform steps 8-1 to 8-5.

For example, still taking the examples in steps 101 to 104 as an example, it can be known in step 104 that since merely class 6 is activated, merely AP2, AP6 and AP14 are activated and AP11 is not activated. Thus, the activation device determines that the AP to be activated at this moment is AP11. The activation device totally counts the number of APs to be activated at this moment contained in each class depending on the determined APs to know that classes 1-2, classes 4-6 and class 8 have no APs to be activated and class 3 and class 7 have one AP to be activated respectively, that is, AP11. Since the number of APs to be activated at this moment contained in class 3 and class 7 is the same (that is, one), class 3 can be picked up as the activation class, and class 7 may also be picked up as the activation class; then, the activation signal is transferred depending on class 3 or class 7. Thereafter, the activation device again determines whether the AP to be activated at this moment has been activated. Since AP2, AP6, AP11 and AP14 are all activated, the activation device can determine that the APs to be activated at this moment have all be activated. And the flow is ended.

In an embodiment of the present invention, the method comprises determining whether a file to be downloaded is a picture or a video before downloading, and if the file to be downloaded is a picture or a video and the wifi network is accessed, then directly downloading a high-definition picture or video, and if the 4G network is accessed, then downloading a standard-definition picture or video to save 4G traffic. This method can help save traffic.

In another embodiment of the present invention, the method comprises creating a wifi fingerprint database, recording the RSSI of a wifi network frequently accessed by the mobile phone and location information thereof, and when a matching fingerprint of the current location of the mobile phone is found in the wifi fingerprint database, automatically accessing the wifi network corresponding to the wifi fingerprint, and if there is no matching wifi fingerprint of the current location, then adopting the 4G network for reissuing data. This algorithm can further improve the access efficiency of wifi networks and can efficiently realize data reissue of the 4G network.

The foregoing takes ideal embodiments of the present invention as an inspiration. Those skilled in the art can perform many changes and modifications without departing from the scope of the technical concept of the present invention based on the above description. The technical scope of the present invention is not limited to the description and shall be determined according to the claims.

The invention claimed is:

1. A method of accelerating a mobile phone network using a wifi accelerator, comprising the following steps:

accessing a wifi network by a wifi module in a smart mobile phone terminal, and activating a 4G network by a 4G module in the smart mobile phone terminal; wherein when a data transmission between the smart mobile phone terminal and an online game server is performed, if a rate of the data transmission is higher than a preset lower limit rate value, the data transmission is performed by the wifi network, and if the rate of the data transmission is lower than the preset lower limit rate value, a communication connection is established between the smart mobile phone terminal and the online game server by the 4G network, such that the data transmission is performed by both the 4G network and the wifi network;

when the smart mobile phone terminal accesses the wifi network by the wifi module, the smart mobile phone terminal accesses a WLAN network by establishing a connection with an AP through the wifi module, and a method of activating the AP in the WLAN network further comprising the following steps:

step 1, calculating a number of APs required for a full coverage of the WLAN network according to a coverage when a transmission power of the WLAN is default and a coverage when a transmission power of the AP is default, dividing a coverage area of each AP by a total area of a WLAN area to obtain a value, and rounding up the value to obtain an integer N;

step 2, performing a clustering and recognition on the APs to obtain a target of 4N classes, arbitrarily selecting an origin of coordinates in the WLAN area, establishing a two-dimensional rectangular coordinate system, and performing the clustering on the APs intensively deployed and distributed evenly in the WLAN area according to geographical locations of the APs through a clustering algorithm to obtain a clustering result;

step 3, forming 4N of AP topologies: selecting to close a plurality of the APs according to the clustering result, realizing the full coverage of the WLAN network with the remaining APs, at the same time, forming an AP distribution structure, and initializing an AP transmission power optimization method; within each class of the 4N classes, selecting an AP at or closest to a clustering center to be an AP to be opened possibly and closing the remaining APs;

step 4, selecting to open N of APs: setting a set U as a set of APs to be selected to open, first, selecting a first AP and adding the first AP to the set U to obtain U={$AP_1$}; second, selecting a second AP furthest away from the first AP and adding the second AP to the set U to obtain U={$AP_1, AP_2$}; then calculating a distance dij between one of the remaining $AP_i$ and an AP in the set U={$AP_1, AP_2, \ldots, AP_j$}, letting $d_i=\min\{di_1, di_2, \ldots, dij\}$; and then selecting a third AP corresponding to a maximum element in the set {$d_1, d_2, \ldots, di$} and adding the third AP to the set U to obtain U={$AP_1, AP_2, \ldots, AP_j, AP_{j+1}$} until a number of elements in the set U reaches N;

step 5, detecting whether APs in the set U in a fully open state fully cover the WLAN area, if not, then continuing to select a fourth AP from the 4N APs to be selected and adding the fourth AP to the set U until a full coverage requirement of the WLAN area is satisfied, and at the same time, closing the remaining APs; and then performing step 6;

step 6, determining whether the transmission power of the AP is reduced under a premise of satisfying the full coverage requirement of the WLAN area, if not, then ending the AP transmission power optimization method; otherwise, reducing the transmission power of a designated AP until all APs operate with a lowest power consumption; and step 7, after a number of connected users of an open AP reaches a threshold, sending by the open AP a request to a controller to open a nearby closed AP, receiving by the controller the request and then issuing by the controller an instruction to activate the nearby closed AP to cause the nearby closed AP to exit from a hibernation mode; and at the same time, sending by the controller a command to the open AP to narrow a coverage range of the open AP, thereby causing an area covered by the open PA to come into a high density deployment mode;

in the step 7, a method of sending the instruction to activate the nearby closed AP further comprising the following steps:

determining an AP to be activated at this moment, wherein each AP belongs to no less than one class synchronously;

counting a number of APs to be activated at this moment in each class;

picking up a class with a largest number of APs to be activated at this moment as an activation class; if there is more than one class "with the largest number of APs to be activated at this moment", picking up one class of the more than one class as the activation class, wherein a pickup policy is random or preconfigured;

transferring activation information through a picked activation class to activate an AP to be activated at this moment in the activation class; and determining whether all APs to be activated at this moment are activated, if yes, then ending the method of sending the instruction to activate the nearby closed AP; otherwise, going back to perform the steps of the method of sending the instruction to activate the nearby closed AP.

2. The method of claim 1, wherein when the smart mobile phone terminal transmits/receives data with the online game server through the wifi network or the 4G network, communication protocols comprise UDP or TCP protocols.

3. The method of claim 1, comprising: determining whether a file to be downloaded is a picture or a video before downloading, and if the file to be downloaded is a picture or a video and the wifi network is accessed, then directly downloading a high-definition picture or video, and if the 4G network is accessed, then downloading a standard-definition picture or video to save 4G traffic.

4. The method of claim 1, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

5. The method of claim 2, comprising: determining whether a file to be downloaded is a picture or a video before downloading, and if the file to be downloaded is a picture or a video and the wifi network is accessed, then directly downloading a high-definition picture or video, and if the 4G network is accessed, then downloading a standard-definition picture or video to save 4G traffic.

6. The method of claim 1, comprising: determining whether a file to be downloaded is a picture or a video before downloading, and if the file to be downloaded is a picture or a video and the wifi network is accessed, then directly downloading a high-definition picture or video, and if the 4G network is accessed, then downloading a standard-definition picture or video to save 4G traffic.

7. The method of claim 2, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

8. The method of claim 3, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

9. The method of claim 5, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

10. The method of claim 6, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

11. The method of claim 1, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

12. The method of claim 1, comprising: determining whether a file to be downloaded is a picture or a video before downloading, and if the file to be downloaded is a picture or a video and the wifi network is accessed, then directly downloading a high-definition picture or video, and if the 4G network is accessed, then downloading a standard-definition picture or video to save 4G traffic.

13. The method of claim 12, comprising: creating a wifi fingerprint database, recording a RSSI of a wifi network frequently accessed by the mobile phone and location information of the wifi network frequently accessed, and when a matching fingerprint of a current location of the mobile phone is found in the wifi fingerprint database, automatically accessing the wifi network corresponding to the wifi fingerprint, and if there is no matching wifi fingerprint of the current location, then adopting the 4G network for reissuing data.

* * * * *